United States Patent
Liao (10) Patent No.: US 6,374,970 B1
(45) Date of Patent: Apr. 23, 2002

(54) COMMUNICATION WIRE DEVICE HAVING A WIRE-WINDING MECHANISM

(76) Inventor: Sheng-Hsin Liao, No. 10, Alley 38, Lane 299, San Chun St., Shulin, Taipei Hsien (TW)

( * ) Notice: Subject to any disclaimer, the term of this patent is extended or adjusted under 35 U.S.C. 154(b) by 0 days.

(21) Appl. No.: 09/699,356

(22) Filed: Oct. 31, 2000

(51) Int. Cl.[7] .............................................. H02G 11/00
(52) U.S. Cl. ................................................... 191/12.4
(58) Field of Search ........................ 191/12.2 R, 12.4, 191/12.2 A; 242/385.4; 379/441, 446, 438, 442, 447

(56) References Cited

U.S. PATENT DOCUMENTS

| | | | | |
|---|---|---|---|---|
| 3,773,987 A | * | 11/1973 | Davis et al. ............... | 191/12.4 |
| 3,782,654 A | * | 1/1974 | Kasa ...................... | 191/12.2 R |
| 5,168,696 A | * | 12/1992 | Mayhew ................ | 191/12.2 R |
| 6,079,657 A | * | 6/2000 | Hwang .................... | 191/12.4 |
| 6,082,656 A | * | 7/2000 | Thornton ................. | 242/385.4 |
| 6,176,358 B1 | * | 1/2001 | Hsin ...................... | 191/12.2 R |
| 6,230,860 B1 | * | 5/2001 | Wu ........................ | 191/12.2 R |

* cited by examiner

*Primary Examiner*—Mark T. Le
(74) *Attorney, Agent, or Firm*—Rosenberg, Klein & Lee (57) ABSTRACT

A communication wire device having a wire-winding mechanism is provided wherein the wire-winding mechanism comprises a box body, a winding disk, and a scroll spring. The box body is installed in the housing and has a wire tank formed therein. The winding disk is pivotally installed in the wire tank. The communication wire is wound around the winding disk. One end of the communication wire can protrude out of the box body. The scroll spring is installed in the box body and joins with the winding disk.

10 Claims, 8 Drawing Sheets

COMMUNICATION WIRE DEVICE HAVING A WIRE-WINDING MECHANISM

FIELD OF THE INVENTION

The present invention relates to a communication wire device having a wire-winding mechanism and, more particularly, to a communication wire device having a communication wire capable of automatically winding, whose length can be adjusted according to necessity so that entanglement of wire due to a too-long length of external wire or inconvenience of use due to a too-short length of external wire will not arise.

BACKGROUND OF THE INVENTION

Appropriate communication wires need to be accommodated to achieve electrical connection when using communications apparatuses such as computers, modems, telephones, or facsimile apparatuses. To avoid entanglement of wire due to a too-long length of external wire or inconvenience of use due to a too-short length of external wire, several kinds of wire-winding boxes applicable to various kinds of communications apparatuses have been proposed. Most of the wire-winding boxes comprise basically a box body, a housing, a communication wire, two winding disks, and two scroll springs. Thereby, the plug of the communication wire can be plugged into sockets of communications apparatuses to accomplish communications of information.

A communication wire may show a tight state due to the resiliency of the scroll spring when it is pulled out from a conventional wire-winding box so that a proper length of the communication wire cannot be kept outside, resulting in much trouble in use for the user.

However, present communications apparatuses such as surge receivers have no wire-winding function, thus resulting in inconvenience of use. It is thus necessary for the user to buy additional wire-winding boxes or extension cords to obtain the wire-winding function.

The present invention aims to resolve the above problems.

SUMMARY OF THE INVENTION

The primary object of the present invention is to provide a communication wire device having a wire-winding mechanism, whereby a long length of the communication wire can be wound and received therein using the wire-winding mechanism. The communication wire can be pulled out directly from the communication wire device. A certain restoring tensile force can be kept due to the action of the scroll spring on the communication wire so that the communication wire can be wound back into the communication wire device successfully. Thereby, entanglement of wire due to a too-long length of external wire or inconvenience of use due to a too-short length of external wire will not arise.

To achieve the above object, the present invention provides a communication wire device having a wire-winding mechanism, which comprises a housing, a circuit unit, and a wire-winding mechanism. The circuit unit is installed in the housing and is connected to a communication wire. The wire-winding mechanism comprises a box body, a winding disk, and a scroll spring. The box body is installed in the housing and has a wire tank formed therein. The winding disk is pivotally installed in the wire tank. The communication wire is wound around the winding disk. One end of the communication wire can protrude out of the box body. The scroll spring is installed in the box body and is connected to the winding disk. A communication wire device having a wire-winding mechanism is thus formed.

The various objects and advantages of the present invention will be more readily understood from the following detailed description when read in conjunction with the appended drawings, in which:

DETAILED DESCRIPTION OF THE PREFERRED EMBODIMENTS

Figure 1:
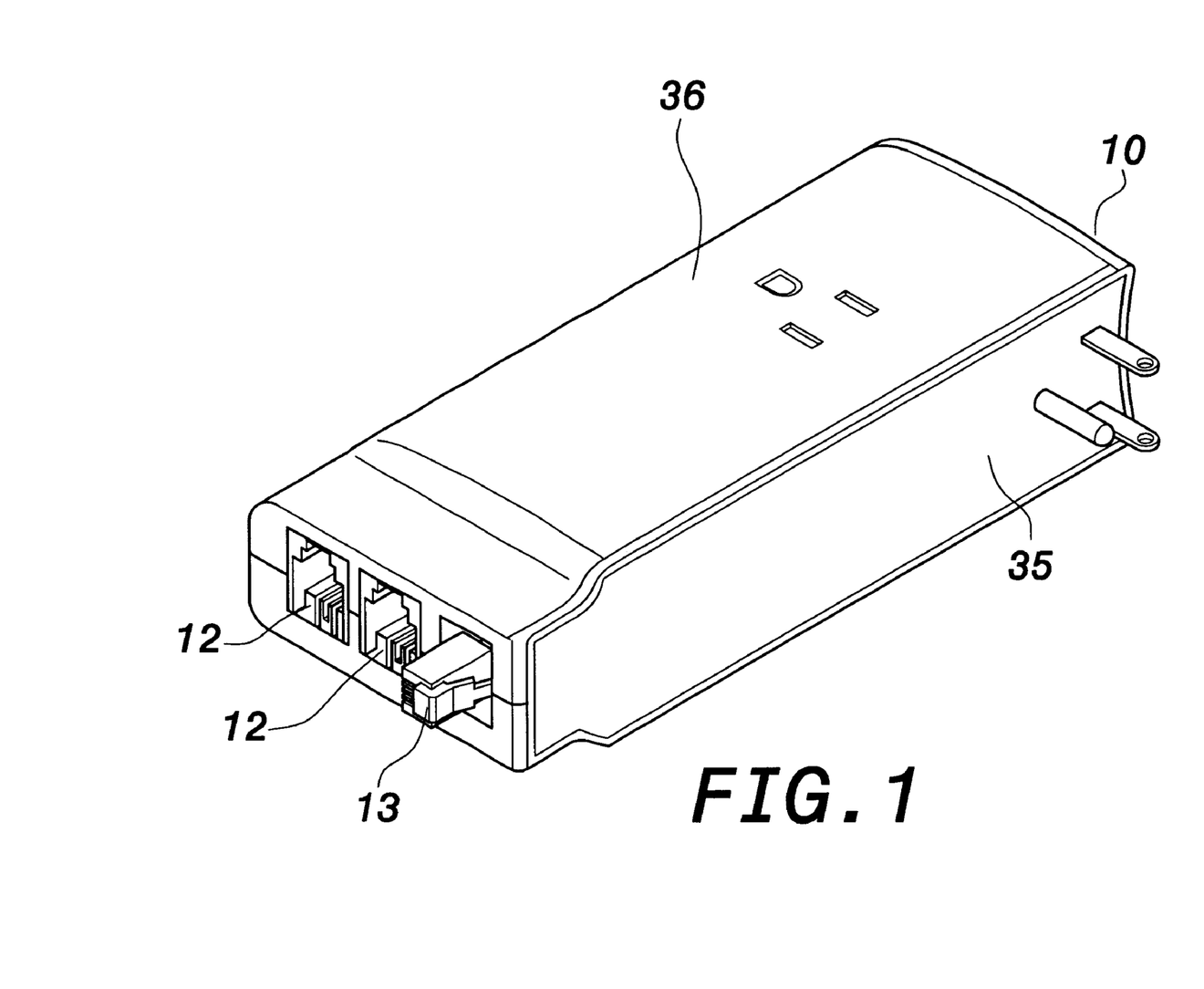
FIG. 1 is a perspective view according to a first embodiment of the present invention.
Figure 2:
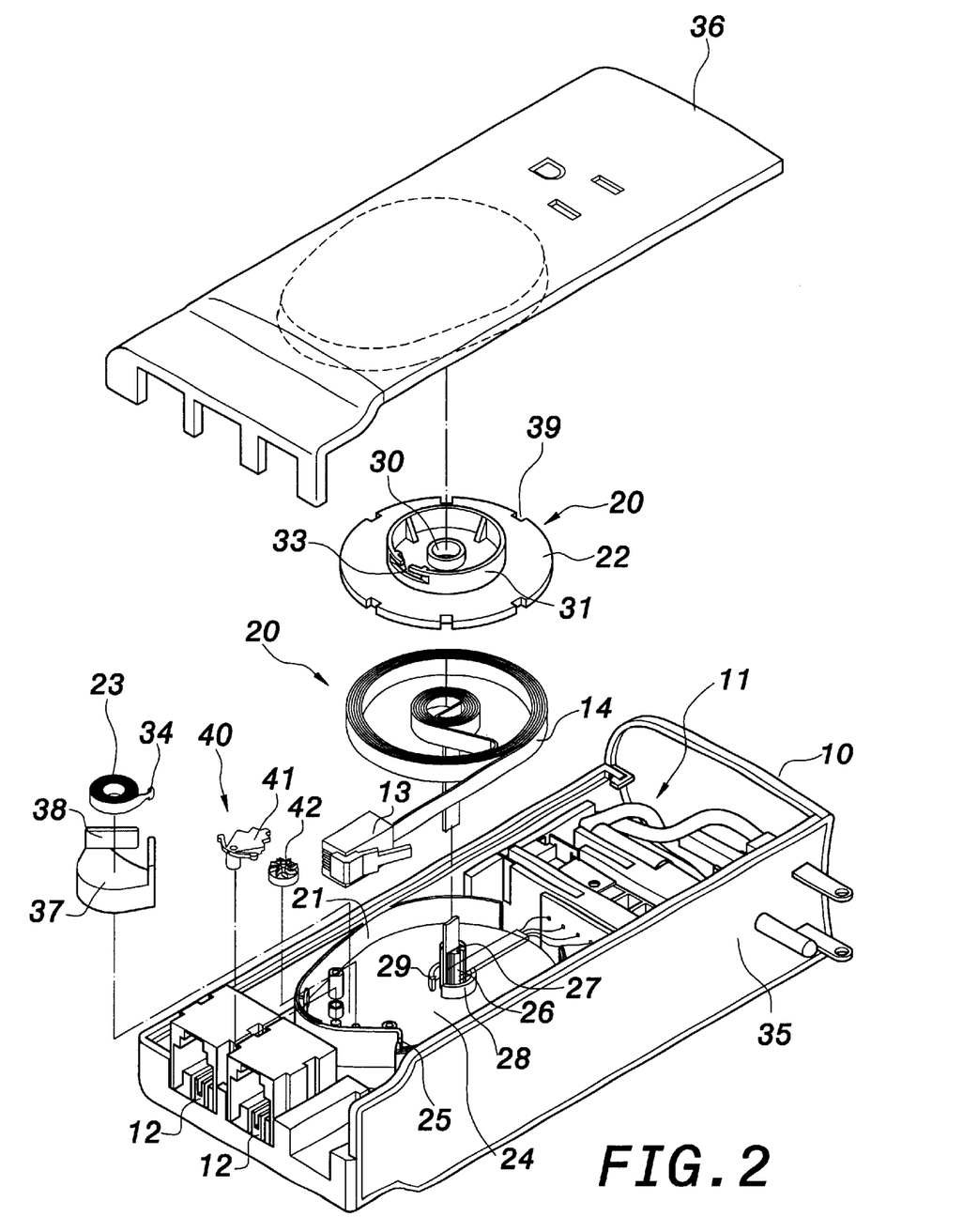
FIG. 2 is an exploded perspective view according to the first embodiment of the present invention.
Figure 3:
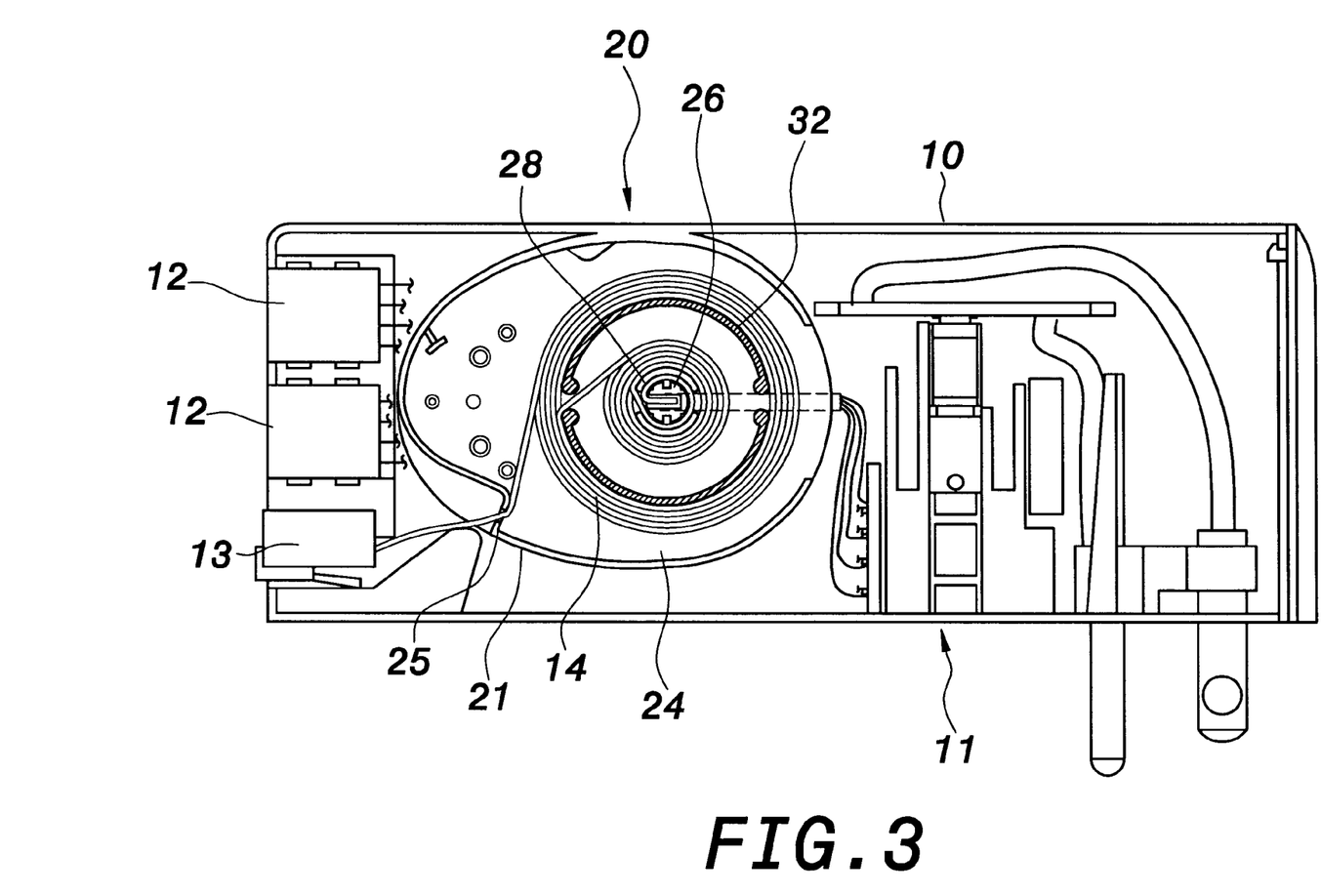
FIG. 3 is a plan view of the internal structure according to the first embodiment of the present invention.

FIGS. 1 to 3 show a communication wire device having a wire-winding mechanism according to a preferred embodiment of the present invention. The communication wire device in this embodiment is a surge receiver. The communication wire device comprises a housing 10. A circuit unit 11 is installed in the housing 10. The circuit unit 11 is connected to at least a first connector 12, and is also connected to a communication wire 14. The other end of the communication wire 14 is connected to a second connector 13. The first connector 12 and the second connector 13 can be plugged on different communications apparatuses, thereby achieving the object of signal transmission.

Figure 4:
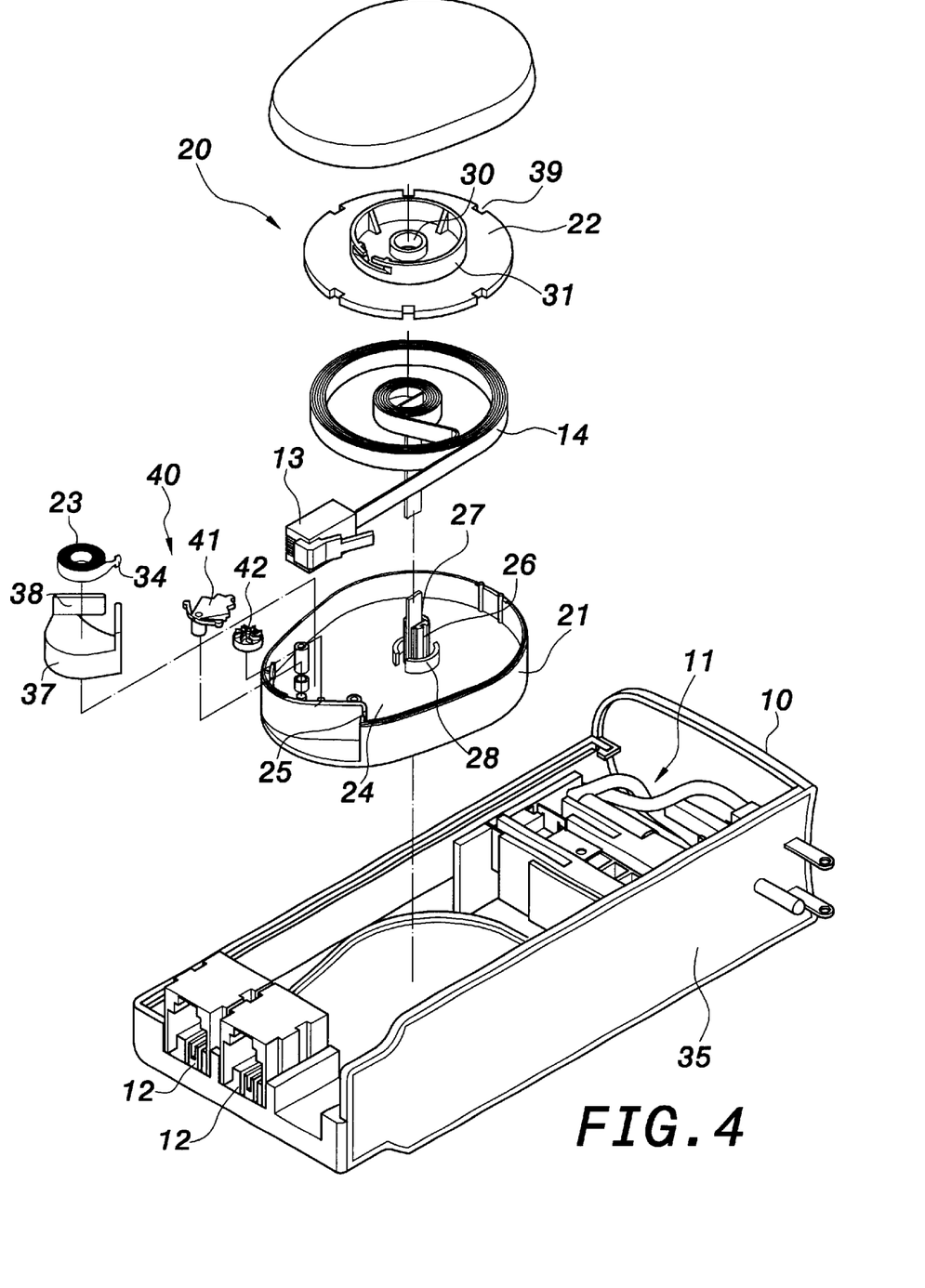
FIG. 4 is an exploded perspective view according to a second embodiment of the present invention.

In the present invention, a wire-winding mechanism 20 is installed in the housing 10. The wire-winding mechanism 20 is situated between the circuit unit 11 and the second connector 13. The wire-winding mechanism 20 comprises a box body 21, a winding disk 22, and a scroll spring 23. The box body 21 can be integrally formed in the housing 10, or can be a separate unit to be assembled in the housing 10, as shown in FIG. 4. A concave wire tank 24 is formed in the box body 21. The communication wire 14 is designed to be a flat wire and properly wound to be matched in the wire tank 24 of the box body 21. A wire hole 25 letting one end of the communication wire 14 protrude out is formed at a predetermined place on the side of the wire tank 24. A projective shaft 26 is installed at the center of the inner side surface of the wire tank 24. A through groove 27 is axially formed on the projective shaft 26. The through groove 27 extends to the bottom of the wire tank 24 and penetrates to one side adjacent to the circuit unit 11. At least a positioning element 28 is installed on the inner side surface of the wire tank 24 (two positioning elements 28 are installed in this embodiment). The positioning element 28 is an arc plate surrounding the projective shaft 26 at a predetermined distance so that a positioning groove 29 is formed between the positioning element 28 and the projective shaft 26. One end of the communication wire 14 penetrates the through groove 27 on the projective shaft 26 in the wire tank 24 so as to be connected to the circuit unit 11. After the communication wire 14 penetrates the through groove 27, it can penetrate the positioning groove so as to be gripped and positioned through the positioning groove 29.

The winding disk 22 is a circular disk with a central axle hole 30 formed thereon. A spring-fixing post 31 and a winding ring 32 are installed on two surfaces of the winding disk 22, respectively. The spring-fixing post 31 and the winding ring 32 are concentrically installed to surround the central axle hole 30. A fastening hole 33 is formed on the spring-fixing post 31. The winding disk 22 is received in the wire tank 24 of the box body 21 and is pivotally installed on the projective shaft 26 via the axle hole 30 so that it can rotate in the wire tank 24. The communication wire 14 is wound around the projective shaft 26 and outside the winding ring 32 of the winding disk 22. The other end of the communication wire 14 protrudes out from the wire hole 25 of the box body 21 so as to be connected to the second connector 13.

The scroll spring 23 is properly positioned in the wire tank 24 of the box body 21. A fastening end 34 of the scroll spring 23 is fastened in the fastening hole 33 of the winding disk 22 so that the scroll spring 23 and the winding disk 22 can be joined. When the winding disk 22 turns, the scroll spring 23 can store energy. The housing 10 comprises a first housing 35 and a second housing 36, which can be assembled together by fastening, screwing, or gluing. Thereby, the wire tank 24 can be closed, and the communication wire 14, the winding disk 22, and the scroll spring 23 assembled in the box body 21 can be properly positioned.

In practical use, a long length of the communication wire 14 can be wound and received through the wire-winding mechanism 20. The communication wire 14 can be pulled out directly from the wire-winding mechanism 20. A certain restoring tensile force can be kept due to the action of the scroll spring 23 on the communication wire 14 so that the communication wire 14 can be wound back into the communication wire device successfully. Thereby, entanglement of wire to a too-long length of external communication wire or inconvenience of use due to a too-short length of external communication wire will not arise.

Moreover, a bearing seat 37 can be installed in the wire tank 24 of the box body 21. Two retaining plates 38 extends from two sides of the bearing seat 37 so that the scroll spring 23 can be placed between the retaining plates 38 and the wall of the housing 10. Furthermore, a plurality of fastening grooves 39 are formed on the edge of the winding disk 22 and a reciprocating control device 40 is installed adjacent to the winding disk 22 so that the user will not be disturbed due to the tensile force when he pulls out the communication wire 14. The reciprocating control device 40 comprises a swing plate 41 capable of swinging freely and a rag wheel 42 capable of rotating freely. Through the interactive functionality of the swing plate 41, the rag wheel 42, and the fastening groove 39 of the winding disk 22, the communication wire 14 can be fixed or received by winding through reciprocating actions of pull and release.

Figure 5:
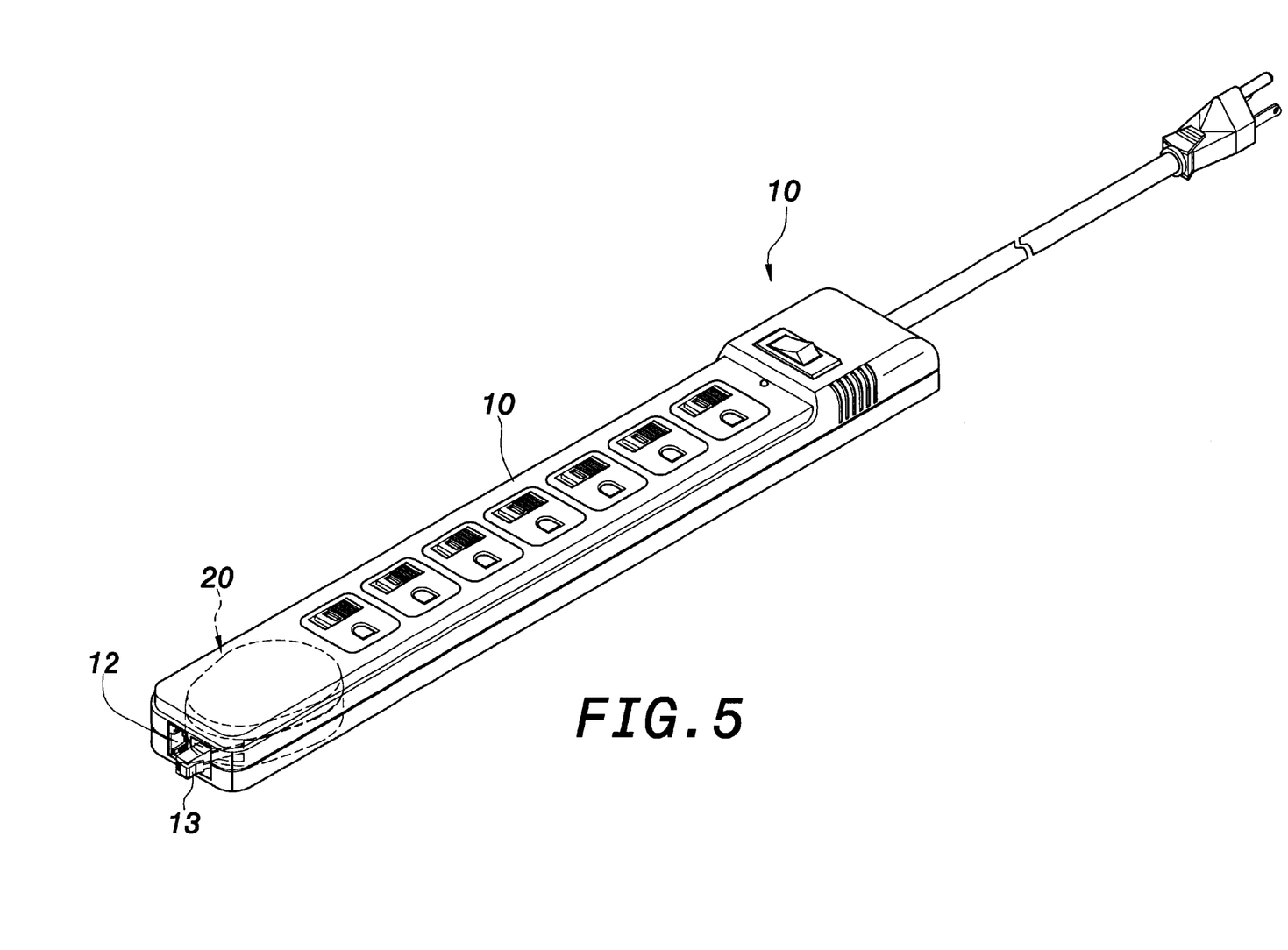
FIG. 5 is a perspective view according to a third embodiment of the present invention.
Figure 6:
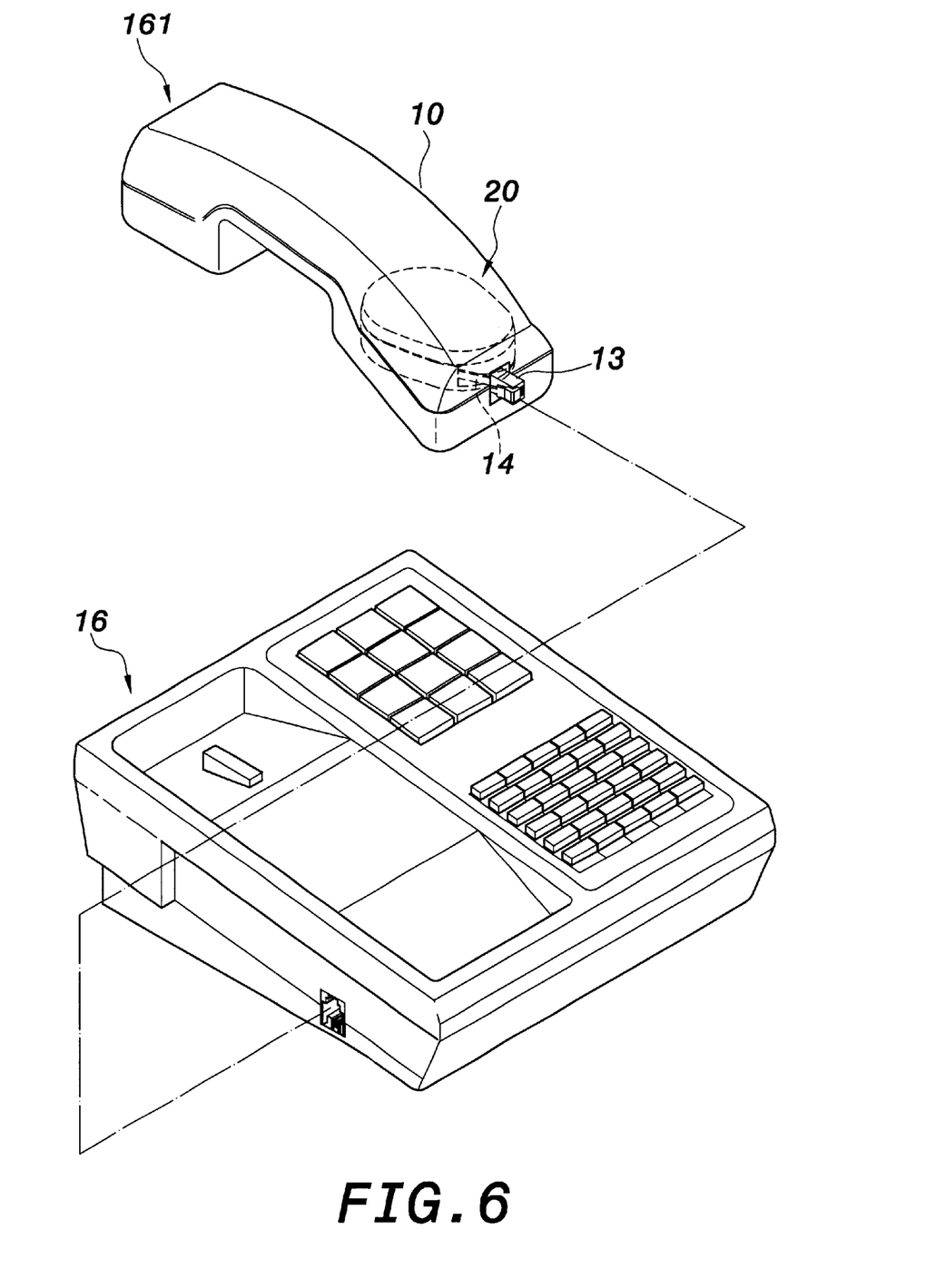
FIG. 6 is a perspective view according to a fourth embodiment of the present invention.
Figure 7:
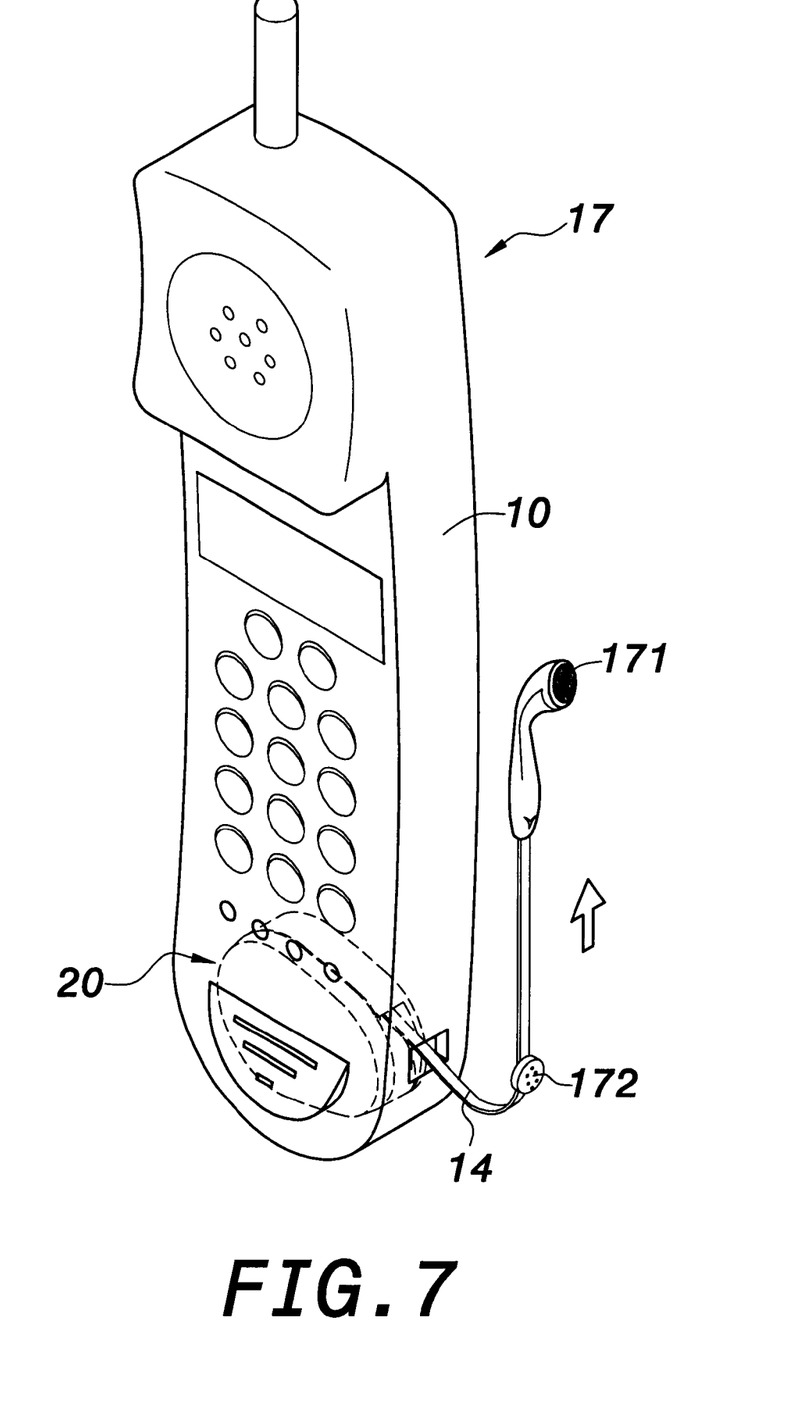
FIG. 7 is a perspective view according to a fifth embodiment of the present invention.
Figure 8:
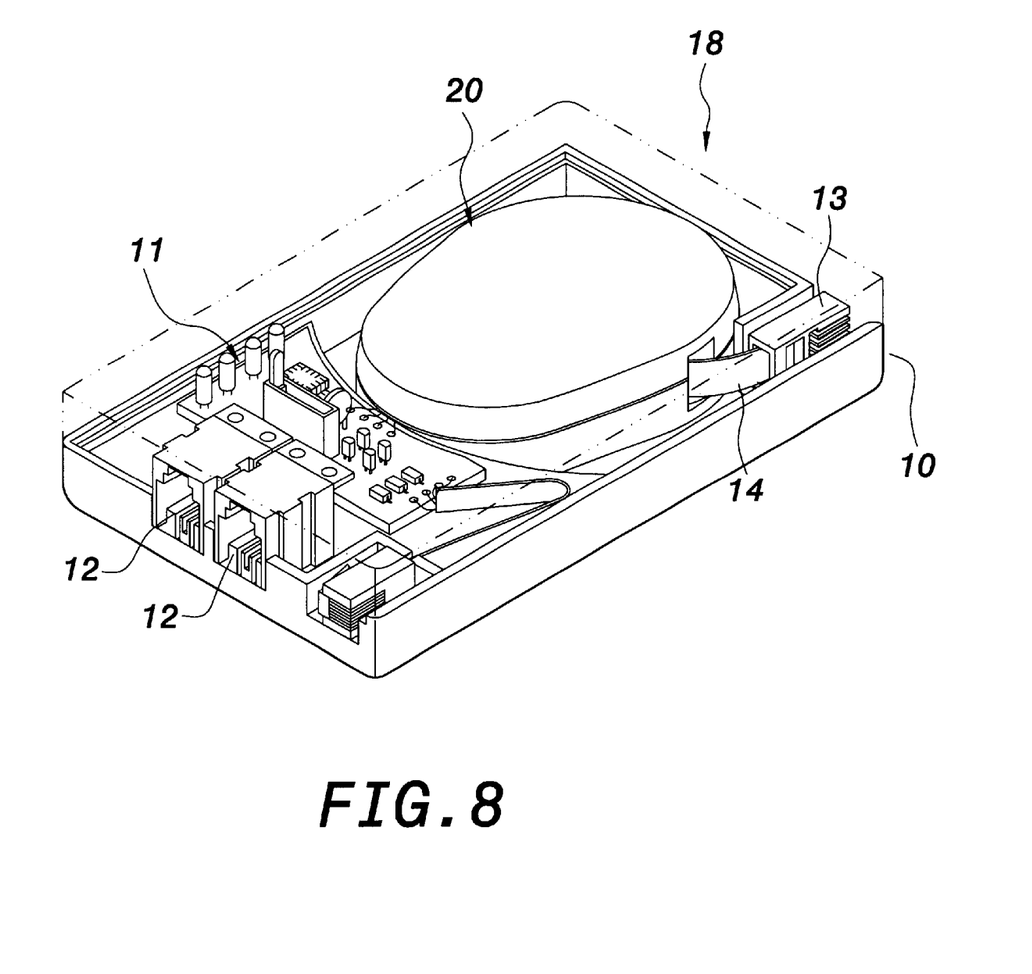
FIG. 8 is a perspective view according to a sixth embodiment of the present invention.

As shown in FIG. 5, the present invention can be applied to an extension cord 15. The present invention can also be applied to a communication wire 14 connected between the handset 161 and the phone base 16 of a telephone, as shown in FIG. 6. Moreover, the present invention can be applied to a communication wire 14 connected between a wireless telephone 17 and a communication apparatus such as an external earphone 171 and a microphone 172, as shown in FIG. 7. Furthermore, the present invention can be applied to different types of surge receivers 18, as shown in FIG. 8.

To sum up, the communication wire device of the present invention is more convenient in use. No additional wire-winding boxes or extension cords are required. Moreover, entanglement of wire due to a too-long length of external wire or inconvenience of use due to a too-short length of external wire will not arise.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. A communication wire device having a wire-winding mechanism, comprising:
    a housing;
    a circuit unit installed in said housing and connected to one end of a communication wire; and
    a wire-winding mechanism comprising a box body, a winding disk, and a scroll spring, said box body being installed in said housing and having a wire tank therein, said wire tank having a projective shaft extending from an inner surface thereof, said projective shaft having an axially extended groove formed therein, said groove extending axially to a bottom of said wire tank and laterally to be in open communication with said circuit unit, said winding disk being pivotally installed on said projective shaft in said wire tank, said communication wire being wound around said winding disk, a second end of said communication wire protruding out from an opening in said box body for coupling to a connector and said first end of said communication wire extending through said groove in said projective shaft for said coupling to said circuit unit, said scroll spring being installed in said box body and joining said winding disk for applying a rewinding bias force thereto.

2. The communication wire device having a wire-winding mechanism as claimed in claim 1, wherein said circuit unit is further connected to at least a connector.

3. The communication wire device having a wire-winding mechanism as claimed in claim 1, wherein said communication wire is a flat wire.

4. The communication wire device having a wire-winding mechanism as claimed in claim 1, wherein said box body is integrally formed in said housing.

5. The communication wire device having a wire-winding mechanism as claimed in claim 1, wherein said box body is a separate unit to be assembled in said housing.

6. The communication wire device having a wire-winding mechanism as claimed in claim 1, wherein said housing comprises a first housing and a second housing.

7. The communication wire device having a wire-winding mechanism as claimed in claim 1, wherein a bearing seat is installed in said wire tank of said box body, and two retaining plates respectively extend from two sides of said bearing seat so that said scroll spring can be placed between said retaining plates and a wall of said housing.

8. The communication wire device having a wire-winding mechanism as claimed in claim 1, wherein a plurality of fastening grooves are formed on an edge of said winding disk, and a reciprocating control device is installed adjacent to said winding disk, said reciprocating control device comprising a swing plate capable of swinging freely and a rag wheel capable of rotating freely, said swing plate and said rag wheel being matched with said fastening grooves of said winding disk.

9. The communication wire device having a wire-winding mechanism as claimed in claim 1, wherein a projective shaft is installed on the inner side surface of said wire tank, a winding ring is installed on one surface of said winding disk, and said winding disk has an axle hole, said winding disk being pivotally installed on said projective shaft via said axle hole, said communication wire being wound around said projective shaft and outside said winding ring of said winding disk.

10. The communication wire device having a wire-winding mechanism as claimed in claim 1, wherein a spring-fixing post having a fastening hole formed therein is installed on one surface of said winding disk, said scroll spring being positioned in said wire tank of said box body, and a fastening end of said scroll spring being fastened in said fastening hole of said spring-fixing post.

* * * * *